Patented Nov. 22, 1932

1,888,713

UNITED STATES PATENT OFFICE

EDGAR C. BRITTON AND HAROLD R. SLAGH, OF MIDLAND, MICHIGAN, ASSIGNORS TO THE DOW CHEMICAL COMPANY, OF MIDLAND, MICHIGAN, A CORPORATION OF MICHIGAN

PREPARATION OF PHOSPHORUS COMPOUNDS

No Drawing.   Application filed July 9, 1929.   Serial No. 377,074.

The invention relates to methods for the preparation of halogen compounds of phosphorus, and has particular regard to a new and improved method for the preparation of phosphorus oxychloride by first chlorinating phosphorus in a solvent to form phosphorus pentachloride and subsequently reacting upon the latter with water or steam under temperature controlled conditions whereby phosphorus oxychloride is produced. A modification of our improved method consists in substituting for water in the second step referred to an organic compound containing a hydroxy group, either alone, as in an alcohol or phenol, or in association with a carbonyl group, CO, to form a carboxylic radical, as in the aliphatic or aromatic carboxylic acids. Such substitution results in the concurrent production of either an organic chloride or acid chloride along with phosphorus oxychloride and constitutes an advantageous method for the preparation of such compounds.

To the accomplishment of the foregoing and related ends, the invention, then, consists of the steps hereinafter fully described and particularly pointed out in the claims, the following description setting forth in detail but a few of the various ways in which the principle of the invention may be used.

Generally speaking, the reactions involved in the present process are as expressed in the following equations. Equation (1) represents the union of phosphorus and chlorine to form phosphorus pentachloride;

(1)   $2P + 5Cl_2 \rightarrow 2PCl_5$ 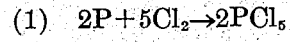

The product of the first reaction then is combined with water to produce phosphorus oxychloride;

(2)   $PCl_5 + H_2O \rightarrow POCl_3 + 2HCl$ 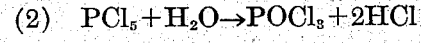

When, instead of water, a compound containing a hydroxyl group is employed, the reaction is expressed by Equation (3);

(3)   $PCl_5 + R.OH \rightarrow POCl_3 + HCl + RCl$ 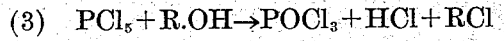

in which R represents either an inorganic element or group, or an organic radical or group. When R represents an organic radical, it may be either an alkyl or aryl group, such as $CH_3$ or $C_6H_5$, or it may be an acyl group, such as $CH_3CO$ or $C_6H_5CO$. In the first case the hydroxylic compound employed is an alcohol or phenol, and the product is an organic chloride, while in the second case the hydroxylic compound is an acid and the product derived therefrom is an acid chloride.

The direct chlorination of phosphorus, particularly when carried out on a large scale, presents operating difficulties owing to the avidity with which the two elements enter into combination. Much heat is generated, and, in fact, the combination may proceed with explosive violence unless means are taken to regulate the speed of the reaction. The latter may be most conveniently accomplished by conducting the reaction in a liquid solvent, and for such purpose we have found phosphorus trichloride or oxychloride, or a mixture of the two, best adapted, in that said compounds are produced in the present process and when initially employed as solvent for the chlorination the separation of reaction products is greatly simplified. Another advantage of using a solvent is that it protects the phosphorus from the action of air that may be present in the reaction vessel.

The chlorination reaction may be conceived as proceeding in two successive steps or stages, first producing phosphorus trichloride and then converting the latter to the pentachloride. By suitable regulation of the proportion of chlorine introduced the reaction, therefore, may be used to prepare either the trichloride or pentachloride or both of them together in any desired proportion. When phosphorus trichloride is initially taken as solvent, the addition of a sufficient quantity of chlorine will naturally result in the chlorination of the solvent, too, after all of the free phosphorus present has been reacted. In practice the chlorination step is not carried through to the point where phosphorus pentachloride is the sole product, for the reason that the reaction mixture would then become solid and in such form would be very difficult to manipulate on account of the highly reactive character of phosphorus pentachloride and its susceptibility to the action of moisture in the air or from any other source. It is preferable that the reaction product be of such composition as to remain liquid at ordinary temperatures in order to facilitate the further handling thereof. The operation is terminated, therefore, while the mixture still remains in a fluid condition and contains more or less trichloride along with the pentachloride. During the chlorination step the temperature is to be maintained below about 70° C. to avoid volatilization of the trichloride.

When phosphorus oxychloride is employed as solvent for the chlorination, it does not take part in the reaction if the latter is maintained below the temperature limit just mentioned. In such case it is feasible to chlorinate all of the phosphorus completely to the pentachloride, if desired, or the reaction may be stopped short of complete chlorination, so that the product consists of a mixture of trichloride, pentachloride and oxychloride.

In the second step or stage of the process, wherein the intermediate reaction product containing phosphorus pentachloride in solution is reacted with water or a compound containing a hydroxyl group, in accordance with Equations (2) or (3), the exothermic character of the reaction is even more pronounced, and the need for employing a solvent to moderate the violence of the reaction is equally imperative if any adequate control is to be exercised over the operation. If the temperature is allowed to rise to an excessive degree, due to lack of adequate control, the reaction between phosphorus pentachloride and water instead of taking the desired course will tend to proceed according to Equation (4), the product of which is phosphoric acid and not phosphorus oxychloride;

(4) $PCl_5 + 4H_2O \rightarrow H_3PO_4 + 5HCl$

The liquid mixture resulting from the chlorination step is, accordingly, most advantageously employed for such second step. While phosphorus trichloride and oxychloride are both reactable with water, also, as illustrated by Equations (5) and (6);

(5) $PCl_3 + 3H_2O \rightarrow H_3PO_3 + 3HCl$
(6) $POCl_3 + 3H_2O \rightarrow H_3PO_4 + 3HCl$ the latter reactions are subordinate to that expressed by Equations (2) or (3) as long as phosphorus pentachloride is present in the mixture. By adding only sufficient water or equivalent compound to react with the phosphorus pentachloride and controlling the temperature of the mixture below about 70° C., the principal reaction may be caused to proceed substantially to the exclusion of the secondary reactions. However, should such secondary reactions take place to a certain extent the products thereof will be converted to phosphorus oxychloride by reaction with phosphorus pentachloride in accordance with Equations (7) and (8);

(7) $H_3PO_3 + 3PCl_5 \rightarrow 3POCl_3 + PCl_3 + 3HCl$
(8) $H_3PO_4 + 3PCl_5 \rightarrow 4POCl_3 + 3HCl$ Consequently, under suitable control of the quantities of reaction materials introduced and of the reaction temperature in the second stage, the final product will consist substantially of phosphorus oxychloride and such amount of phosphorus trichloride as was present in the mixture at the beginning of the step, together with hydrochloric acid or equivalent chlor-compound, free from material inclusion of secondary reaction products.

The separation of phosphorus oxychloride and trichloride from the reaction product is readily accomplished by simple distillation. The recovered trichloride may be returned as solvent for the initial reaction either alone or admixed with a certain proportion of oxychloride. In practice the mixed intermediate fraction from the distillation, containing both trichloride and oxychloride, may be added to the trichloride fraction and the combined fractions used as solvent in the chlorination step of a succeeding operation. If desired, also, the entire reaction product may be employed as solvent for a succeeding operation by adding more phosphorus thereto and repeating the same procedure as before, in this way cycling the products of the process until a sufficient accumulation thereof is obtained, whereupon the combined products may be distilled for the separation of the individual compounds.

The following specific examples illustrate various ways in which our improved method or process may be applied, but it will be understood that the invention is not limited thereto.

*Example 1*

In a suitable lead lined chlorinating vessel containing 100 lbs. phosphorus oxychloride was placed 31 lbs. yellow phosphorus. Chlorine was then passed in, while the temperature of the mixture was maintained below 70° C., until a quantity of 144 lbs. had been added. The reaction product then contained approximately 100 lbs. $POCl_3$, 130 lbs. $PCl_5$ and 48.7 lbs. $PCl_3$. This mixture was then treated with stirring with 11.6 lbs. water as vapor distilled from a still connected to the reaction vessel, such introduction of water vapor taking place during a period of 1 hour, and the temperature being kept below 70° C. 46 lbs. HCl was evolved from the reaction vessel. Fractional distillation of the residual mixture gave 46 lbs. $PCl_3$ (94.5 per cent. yield) and 193 lbs. $POCl_3$ (97.4 per cent. yield).

*Example 2*

A mixture containing 306 grams $POCl_3$, 110 grams $PCl_3$ and 124 grams $PCl_5$ was prepared as in Example 1 and then introduced into a flask provided with a stirrer, reflux condenser and vapor outlet leading to a condenser and receiver. During a period of 1 hour 36 grams glacial acetic acid was added, the temperature being regulated at about 46° C. Thereupon heating was continued for 1 hour at 50° C. and for ½ hour longer at 68° C. 41 grams acetyl chloride distilled off and was collected, yield 88.2 per cent. Fractionation of the residual mixture gave 391 grams $POCl_3$ and 100 grams $PCl_3$. A yield of 85 grams $POCl_3$ was obtained in addition to the initial charge, amounting to 92.9 per cent. of theory.

Example 3

A mixture consisting of 300 grams $PCl_3$ and 208 grams $PCl_5$ was prepared by chlorinating phosphorus using $PCl_3$ as diluent. To this mixture 46 grams absolute alcohol was added during a period of 1½ hours, the temperature being maintained at about 47° C., and after all alcohol was added heating was continued at 70° C. for 1 hour. Ethyl chloride distilled from the reaction mixture and 55 grams thereof was collected, corresponding to 85 per cent. yield. On fractionating 145 grams $POCl_3$ was obtained, amounting to 94.6 per cent. yield, and 289 grams $PCl_3$ was recovered.

Among the advantages to be gained by operating in accordance with the process of our invention are: (1) a simple and effective means for controlling the reaction in each of the principal steps is afforded by employing a solvent; (2) the separation of the reaction products is greatly simplified by using as solvent an intermediate product or one of the final products of the process, or a mixture thereof; (3) a high yield of phosphorus oxychloride is obtained; (4) the preparation of organic chlorides or acid chlorides may be combined with that of phosphorus oxychloride; (5) the phosphorus pentachloride required for such combination process is obtained as an intermediate product in an easily handled liquid mixture suitable for the purpose without necessity for the separation and purification thereof.

In analogous fashion we may proceed for the preparation of similar compounds of phosphorus and bromine, as well as organic bromides or acid bromides.

The present application is a continuation in part of our pending application Serial No. 151,012, filed Nov. 26, 1926.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. A process of preparing halogen compounds of phosphorus which comprises reacting phosphorus and a halogen in a liquid medium including at least one halogen derivative of phosphorus.

2. A process of preparing halogen compounds of phosphorus which comprises reacting phosphorus and a halogen in a liquid medium including the corresponding phosphorus trihalide.

3. A process of preparing halogen compounds of phosphorus which comprises reacting between phosphorus and a halogen in a liquid medium including the corresponding phosphorus trihalide and oxyhalide.

4. A process of preparing a phosphorus oxyhalide which comprises reacting phosphorus and a halogen in a liquid medium including at least one halogen derivative of phosphorus to form a liquid mixture of phosphorus pentahalide and lower halogenated phosphorus derivatives and then subjecting the product of such first step to the action of a compound containing a hydroxyl group in amount equivalent to the phosphorus pentahalide contained therein, while maintaining the temperature below about 70° C.

5. A process of preparing a phosphorus oxyhalide which comprises reacting phosphorus and a halogen in a liquid medium including the corresponding phosphorus trihalide to form a liquid mixture of phosphorus pentahalide and lower halogenated phosphorus derivatives and then subjecting the product of such first step to the action of a compound containing a hydroxyl group in amount equivalent to the phosphorus pentahalide contained therein, while maintaining the temperature below about 70° C.

6. A process of preparing a phosphorus oxyhalide which comprises reacting phosphorus and a halogen in a liquid medium including the corresponding phosphorus trihalide and oxyhalide to form a liquid mixture of phosphorus pentahalide and lower halogenated phosphorus derivatives and then subjecting the product of such first step to the action of a compound containing a hydroxyl group in amount equivalent to the phosphorus pentahalide contained therein, while maintaining the temperature below about 70° C.

7. A process of preparing chlorine compounds of phosphorus which comprises reacting phosphorus and chlorine in a liquid medium including at least one chlorine derivative of phosphorus.

8. A process of preparing chlorine compounds of phosphorus which comprises reacting phosphorus and chlorine in a liquid medium including phosphorus trichloride.

9. A process of preparing chlorine compounds of phosphorus which comprises reacting phosphorus and chlorine in a liquid medium including phosphorus trichloride and phosphorus oxychloride.

10. A process for preparing phosphorus oxychloride which comprises reacting phosphorus and chlorine in a liquid medium including at least one chlorine derivative of phosphorus to form a liquid mixture of phosphorus pentachloride and lower chlorinated phosphorus derivatives and then subjecting the product of such first step to the action of a compound containing a hydroxyl group in amount equivalent to the phosphorus pentachloride contained therein, while maintaining the temperature below about 70° C.

11. A process of preparing phosphorus oxychloride which comprises reacting phosphorus and chlorine in a liquid medium including phosphorus trichloride to form a liquid mixture of phosphorus pentachloride and lower chlorinated phosphorus derivatives and then subjecting the product of such first step to the action of a compound containing a hydroxyl group in amount equivalent to the phosphorus pentachloride contained therein, while maintaining the temperature below about 70° C.

12. A process of preparing phosphorus oxychloride which comprises reacting phosphorus and chlorine in a liquid medium including phosphorus trichloride and phosphorus oxychloride to form a liquid mixture of phosphorus pentachloride and lower chlorinated phosphorus derivatives and then subjecting the product of such first step to the action of a compound containing a hydroxyl group in amount equivalent to the phosphorus pentachloride contained therein, while maintaining the temperature below about 70° C.

13. A process of preparing phosphorus oxychloride and an acyl chloride conjointly which comprises reacting phosphorus and chlorine in a liquid medium including at least one of the compounds phosphorus trichloride and phosphorus oxychloride, adding thereto an organic carboxylic acid in amount equivalent to the phosphorus pentachloride contained therein, while maintaining the temperature below 70° C., and then separating the resulting acid chloride and phosphorus oxychloride by distillation from the reaction product.

14. A process of preparing phosphorus oxychloride and an acyl chloride conjointly which comprises reacting phosphorus and chlorine in a liquid medium including at least one of the compounds phosphorus trichloride and phosphorus oxychloride, adding acetic acid thereto in amount equivalent to the phosphorus pentachloride contained therein, while maintaining the temperature below 70° C., and then separating acetyl chloride and phosphorus oxychloride by distillation from the reaction product.

15. A process of preparing phosphorus oxychloride and an organic chloride conjointly, which comprises reacting phosphorus and chlorine in a liquid medium including at least one of the compounds phosphorus trichloride and phosphorus oxychloride, adding an alcohol in amount equivalent to the phosphorus pentachloride thereby formed, while maintaining the temperature below 70° C., and then separating the resulting organic chloride and phosphorus oxychloride by distillation from the reaction product.

16. A process of preparing phosphorus oxychloride, which comprises reacting phosphorus and chlorine in a liquid medium including at least one of the compounds phosphorus trichloride and phosphorus oxychloride to form a solution of phosphorus pentachloride, adding water thereto in amount equivalent to such pentachloride, while maintaining the temperature below 70° C. and separating phosphorus oxychloride from the reaction product.

Signed by us this 6th day of June, 1929.

EDGAR C. BRITTON.
HAROLD R. SLAGH.